United States Patent
Pan

(10) Patent No.: US 9,717,363 B2
(45) Date of Patent: Aug. 1, 2017

(54) WATER TANK TYPE ELECTRIC STEAMER

(71) Applicant: X.J. Electrics (Hubei) Co., Ltd, Huanggang (CN)

(72) Inventor: Yun Pan, Huanggang (CN)

(73) Assignee: X.J. ELECTRICS (HUBEI) CO., LTD, Huanggang, Hubei (CN)

( * ) Notice: Subject to any disclaimer, the term of this patent is extended or adjusted under 35 U.S.C. 154(b) by 421 days.

(21) Appl. No.: 14/489,033

(22) Filed: Sep. 17, 2014

(65) Prior Publication Data
US 2015/0366394 A1 Dec. 24, 2015

(30) Foreign Application Priority Data
Jun. 19, 2014 (CN) .................... 2014 2 0328869 U

(51) Int. Cl.
A47J 37/12 (2006.01)
A47J 27/05 (2006.01)
A47J 27/04 (2006.01)

(52) U.S. Cl.
CPC .......... *A47J 27/05* (2013.01); *A47J 2027/043* (2013.01)

(58) Field of Classification Search
CPC A47J 27/04; A47J 27/043; A47J 27/05; A47J 27/082; A47J 27/086; A47J 27/13; A23L 5/13
USPC ........................... 99/410, 413, 415, 416, 417
See application file for complete search history.

(56) References Cited

U.S. PATENT DOCUMENTS

| | | | | |
|---|---|---|---|---|
| 492,195 A * | 2/1893 | Doty | ..................... | A47J 27/082 126/369.3 |
| 5,069,198 A * | 12/1991 | Henderson | .............. | A47J 36/20 126/348 |
| 5,216,947 A * | 6/1993 | Cheng | ..................... | A47J 27/05 126/348 |
| 5,404,803 A * | 4/1995 | Glucksman | ............. | A47J 27/04 126/369.1 |
| 5,974,953 A * | 11/1999 | Messerli | ................. | A47J 27/05 126/20 |
| 6,267,046 B1 * | 7/2001 | Wanat | ..................... | A47J 27/05 99/332 |
| 6,840,159 B1 * | 1/2005 | Li | ........................... | A47J 27/05 99/337 |
| 2002/0157542 A1 * | 10/2002 | Pretre | ..................... | A47J 27/05 99/417 |
| 2004/0112372 A1 * | 6/2004 | Dumoux | ................. | A47J 27/05 126/369 |

(Continued)

*Primary Examiner* — Dana Ross
*Assistant Examiner* — Lindsey C Staubach
(74) *Attorney, Agent, or Firm* — Hamre, Schumann, Mueller & Larson, P.C.

(57) ABSTRACT

The present invention provides a water tank type steamer. The water tank type steamer includes a base which defines a recess therein. A plurality of steam racks which are hollow are inserted into the recess by stacking one by one from top to down. The bottom of a side wall of each steam rack is bent inwards to form a stage. An outside wall of the stage is nested in the top of the side wall of the lower steam rack. A rack bottom for holding food is put on the inner side of the stage. The bottom of the recess arranges a water storage pool. A through slot and a jack are disposed on the base. The through slot communicates the water storage pool and the jack. The jack connects a water tank. The outlet of the water tank orientates downwards to communicate with the jack.

8 Claims, 12 Drawing Sheets

(56) References Cited

U.S. PATENT DOCUMENTS

| | | | |
|---|---|---|---|
| 2010/0024666 A1* | 2/2010 | Lee | A47J 27/084 99/473 |
| 2012/0103200 A1* | 5/2012 | Cheung | A47J 27/05 99/448 |
| 2012/0247342 A1* | 10/2012 | Van Der Vlis | A47J 27/05 99/330 |
| 2015/0053095 A1* | 2/2015 | Lin | A47J 27/05 99/403 |

* cited by examiner

WATER TANK TYPE ELECTRIC STEAMER

TECHNICAL FIELD

The present invention relates to a kitchen used electrically heating steamer technology field, and particularly to a water tank type electric steamer.

BACKGROUND

The steamer is a kitchen used cooker that heats the water to generate high temperature steam, and then the food is steamed by the generated high temperature steam. The existing cooker generally includes a steamer cover, a steamer rack, a base, a water tank, an electrically heating element and so on. The steamer rack can be a single layer rack or a multi-layers rack. The existing cooker has the following disadvantages: 1. the bottom layer rack is difficult to be detached from the base due to the steamer rack being placed on the base; 2. it is difficult to mount the top layer rack to the lower layer rack or detach the top layer rack from the lower rack because the top layer rack should align to the lower rack by an alignment structure when stacking the top rack to the lower rack, the rack is difficult to clean because the rack and the rack bottom are integrated as a whole; 3. the water tank is settled on the base that results unsteady of the steamer and further results the water tank is difficult to detached, additionally the water in the water tank is not balanced, this easily dries up the steamer, thereby damaging the steamer and shortening the service time of the steamer.

SUMMARY

The object of the present invention is to provide a water tank type steamer being conveniently to detach and assemble the steam rack, conveniently to clean and disinfect the rack, steadily assemble the water tank, avoid to run dry the steamer due to the unbalanced water in the water tank, and further improve the service time of the steamer.

In order to solve the above technical problems, a water tank type steamer provided in the present invention includes a base defining a recess therein. A plurality of hollow steam racks are inserted into the recess by stacking one by one from top to down. A bottom of a side wall of each steam rack is bent inwards to form a stage. An outside wall of the stage is nested in the top of the side wall of the lower steam rack. A rack bottom for holding food is put on the inner side of the stage. The bottom of the recess arranges a water storage pool for generating high temperature steam. A through slot for water going through and a jack are defined on the base. The through slot communicates the water storage pool and the jack. The jack connects a water tank and the outlet of the water tank orientates downwards to communicate with the jack.

Preferably, the outlet of the water tank rotatably connects with a hollow rotatable cover, the rotatable cover includes a cover body, two extending parts extending from the cover body, the two extending parts form a draining opening to prevent the water in the water tank being too full to overflow to the water storage pool, the rotatable cover is inserted into the jack.

Preferably, a waterproof shield for preventing the high temperature steam in the water storage pool flowing to the water tank is inserted to the through slots, the bottom of the side of the waterproof shield adjacent to water storage pool opens a first opening, and the bottom of opposite side of the waterproof shield opens a second opening, the first opening communicates with the through slot, and the second opening communicates with the draining opening.

Preferably, a water intake pole is inserted to the outlet of the water tank insets, an end of the water intake pole which locates inside the water tank arranges a sealing block for sealing the outlet of the water tank, the other end of the water intake pole located outside the water tank connects with a support plate, a bottom of the jack arranges a support pole for supporting the support plate.

Preferably, the outlet of the water tank is shaped as a trapezoid with long upper side and short lower side, the shape of the sealing block matches with shape of the outlet of the water tank and is a reversed taper shape.

Preferably, the base arranges a protruding block, a positioning groove is defined on the water tank, the protruding block engages with the positioning groove.

Preferably, the rack bottom uniformly distributes a plurality of holes providing for the high temperature steam to go through.

Preferably, a slot for being convenient to be taken by hand is arranged on the back of the water tank.

Preferably, two opposite sides of each of the plurality of the steam racks is provided with handles for being convenient to be lifted.

Because the base of the water tank type steamer arranges the recess and the steam rack, the plurality of steam racks stacks one by one from top to down, the bottom of a side wall of each steam rack is bent inwards to form a stage, the outside of the stage of the lowest steam rack is nested in the recess, and the other steam racks are respectively nested in the lower steam rack, the detachment and assembling between the lowest steam rack and the base are convenient. Further since it is unnecessary to align the steam racks through an align structure when stacking the upper steam stack to the lower steam stack, it is convenient to stack or remove the upper steam stack. Additionally, the rack bottom is put on the inner side of the stage, so the rack bottom is easy to be detached and cleaned. The bottom of the recess defines a water storage pool for generating high temperature steam, the base further defines a through slot for going through the water and a jack, the through slot communicates the water storage pool and the jack, the jack connects a water tank, and the outlet of the water tank orientates downwards to communicate with the jack, thereby, the water in the water tank goes into the jack through the outlet, and then goes through the through slot and flows into the water storage pool to form a steady water supply channel. Therefore, the using of the water tank avoids the steamer to run dry and improves the service life of the steamer.

DETAILED DESCRIPTION OF THE PREFERRED EMBODIMENTS

In order to clearly describe the object, technical solutions, and advantages of the present invention, the accompanied drawings and embodiments are used to describe the present invention in detail. It should be understood, the embodiments described here intends to explain the present invention, and do not intend to limit the present invention.

As shown in FIGS. 1-12, a preferred embodiment of the present invention is illustrated.

Figure 1:
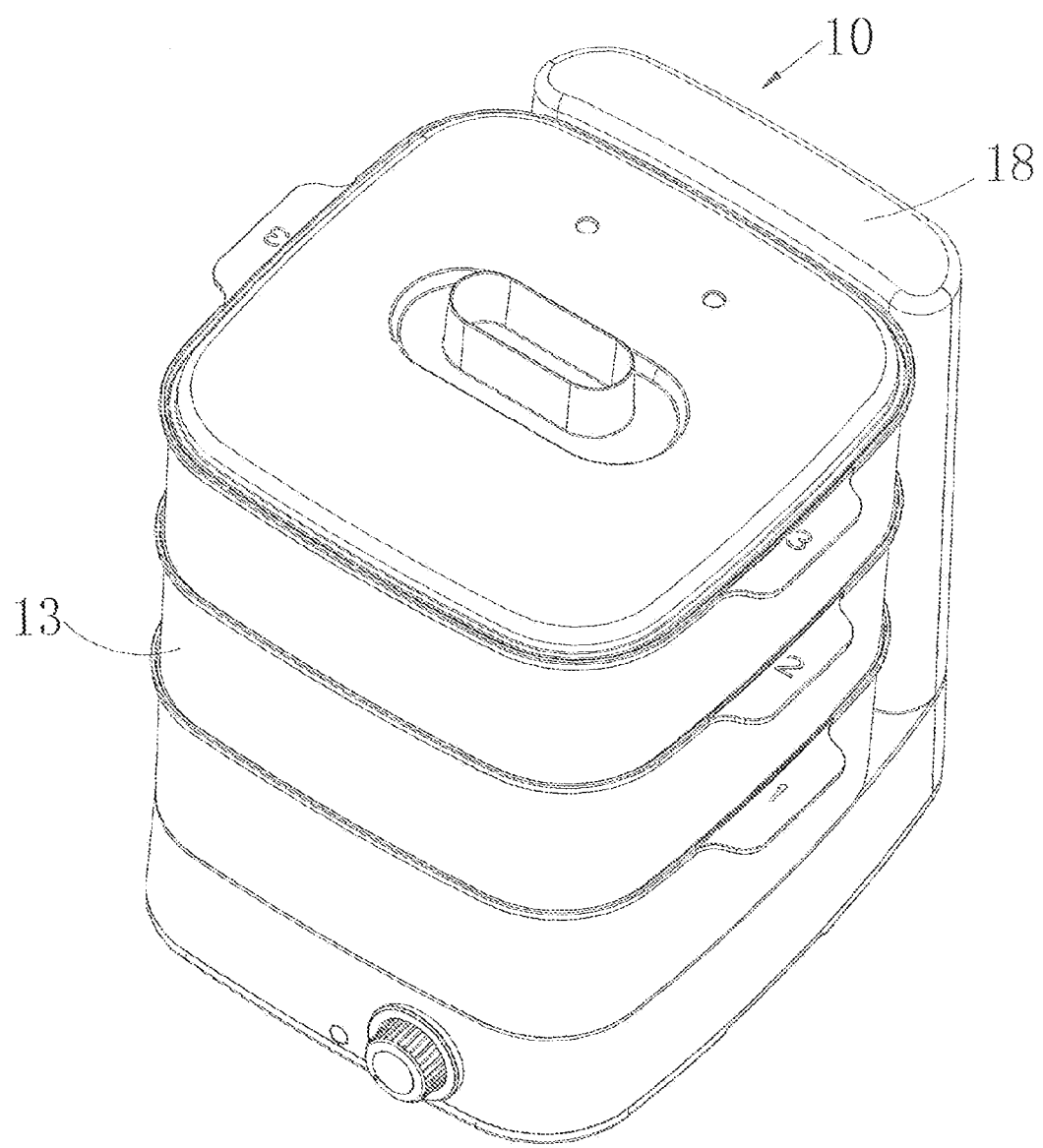
FIG. 1 is a perspective view of a water tank type electric steamer in accordance with an embodiment of the present invention.
Figure 2:
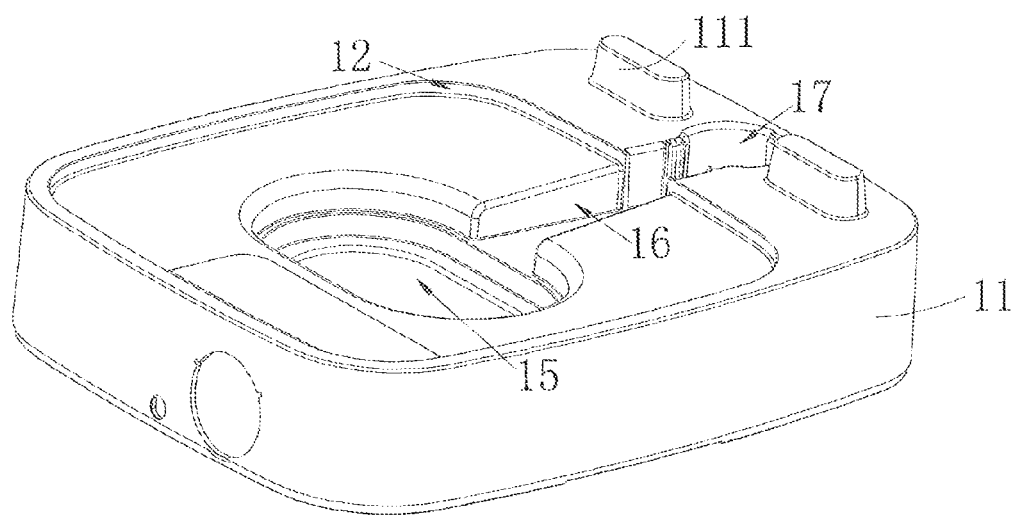
FIG. 2 is a perspective view of a base of the water tank type electric steamer in accordance with an embodiment of the present invention.
Figure 3:
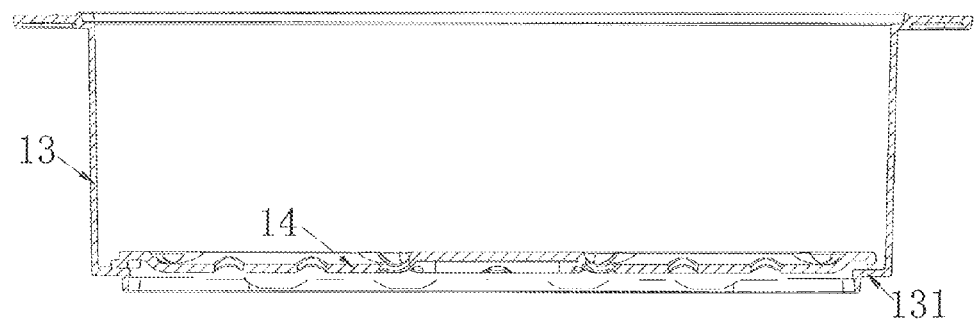
FIG. 3 is a section view of a steamer rack and a rack bottom of the water tank type electric steamer in accordance with an embodiment of the present invention.
Figure 4:
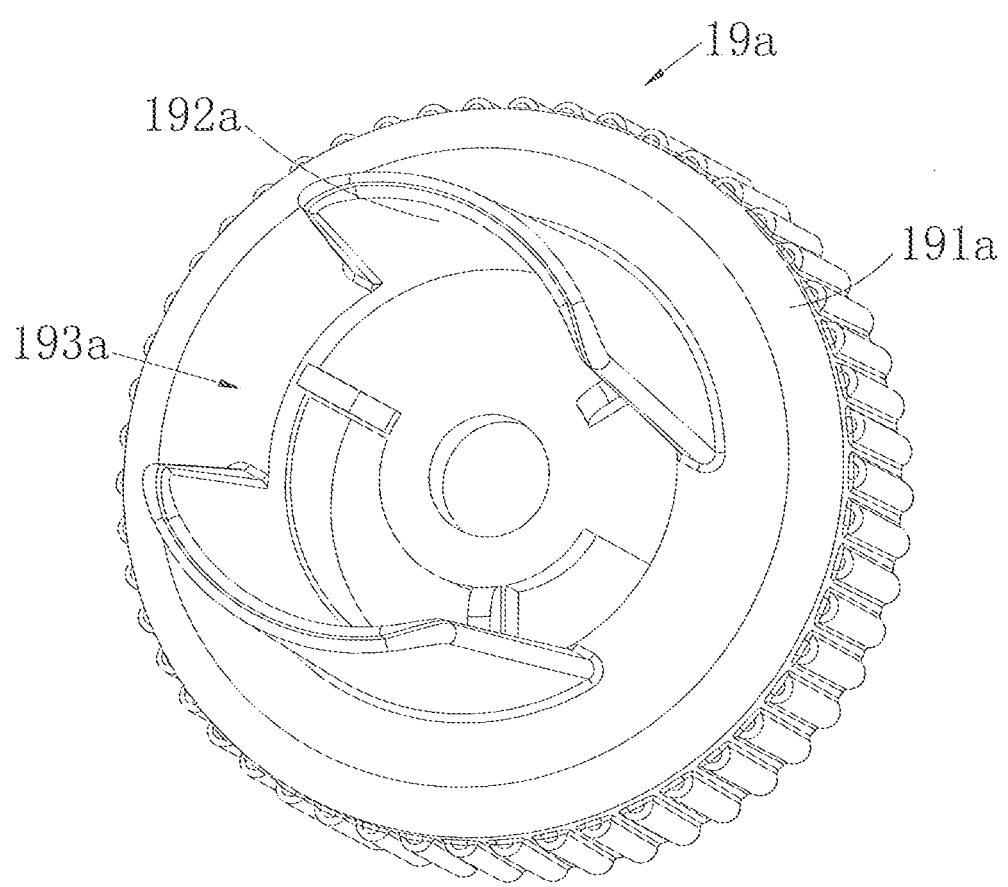
FIG. 4 is a respective view of a rotatable cover of the water tank type electric steamer in accordance with a first embodiment of the present invention.

Referring to FIGS. 1-3, a water tank type steamer 10 provided in the embodiment is a kitchen used cooker that heats the water to generate high temperature steam, and then the food is steamed by the generated high temperature steam. The steamer 10 includes a base 11 defining a recess 12 therein. A plurality of steam racks 13 which are hollow are inserted into the recess 12 by stacking one by one from top to down. The bottom of a side wall of each steam rack 13 is bent inwards to form a stage 131. An outside of the stage 131 is nested in the top of the side wall of the lower steam rack 13. An outside wall of the stage 131 of the lowest steam rack 13 is nested in the recess 12. A rack bottom 14 for holding food is put on the inner side of the stage 131. A water storage pool 15 for generating high temperature steam is disposed on the bottom of the recess 12. The base 11 further defines a through slot 16 for going through the water and a jack 17. The through slot 16 communicates with the water storage pool 15 and the jack 17. The jack 17 connects a water tank 18. An outlet 186 of the water tank 18 orientates downwards to communicate with the jack 17.

Referring to FIGS. 1-3, because the base 11 of the water tank type steamer 10 defines the recess 12 and the steam rack 13, the plurality of steam racks 13 stacks one by one from top to down, the bottom of a side wall of each steam rack 13 is bent inwards to form a stage 131, the outside of the stage 131 of the lowest steam rack 13 is nested in the recess 12, and the other steam racks 13 are respectively nested in the lower steam rack 13, the detachment and assembling between the lowest steam rack 13 and the base 11 are convenient. Further since it is unnecessary to align the steam racks 13 through an align structure when stacking the upper steam stack 13 to the lower steam stack 13, it is convenient to stack or remove the upper steam stack 13. Additionally, the rack bottom 14 is put on the inner side of the stage 131, so the rack bottom 14 is easy to be detached and cleaned.

The bottom of the recess 12 defines a water storage pool 15 for generating high temperature steam, the base 11 further defines a through slot 16 for going through the water and a jack 17, the through slot 16 communicates the water storage pool 15 and the jack 17, the jack 17 connects a water tank 18, and the outlet 186 of the water tank 18 orientates downwards to communicate with the jack 17, thereby, the water in the water tank 14 goes into the jack 17 through the outlet 186, and then goes through the through slot 16 and flows into the water storage pool 15 to form a steady water supply channel. Therefore, the using of the water tank 18 avoids the steamer to run dry and improves the service life of the steamer.

In order to firmly fix the water tank 18, as shown in FIGS. 4 to 7, a hollow rotatable cover 19 is rotatably fixed on the outlet 186 of the water tank 18. The rotatable cover 19 is inserted into the jack 17.

In a first embodiment, the rotatable cover 19 includes a cover body 191a, two symmetrically extending parts 192a extending from the cover body 191a. In order to improve the water supply channel of the water tank 18, two extending parts 192a form a draining opening 193a for preventing the water in the water tank 18 being too full to overflow to the water storage pool 15. Thereby, the water in the water storage pool 15 can be kept in a reasonable level, not too full or too little. The food may be immersed to the water to effect the taste of the food if the water in the water storage pool 15 is too full. The steamer 10 may be run dry to damage the steamer 10 if the water in the water tank is too little.

Figure 5:
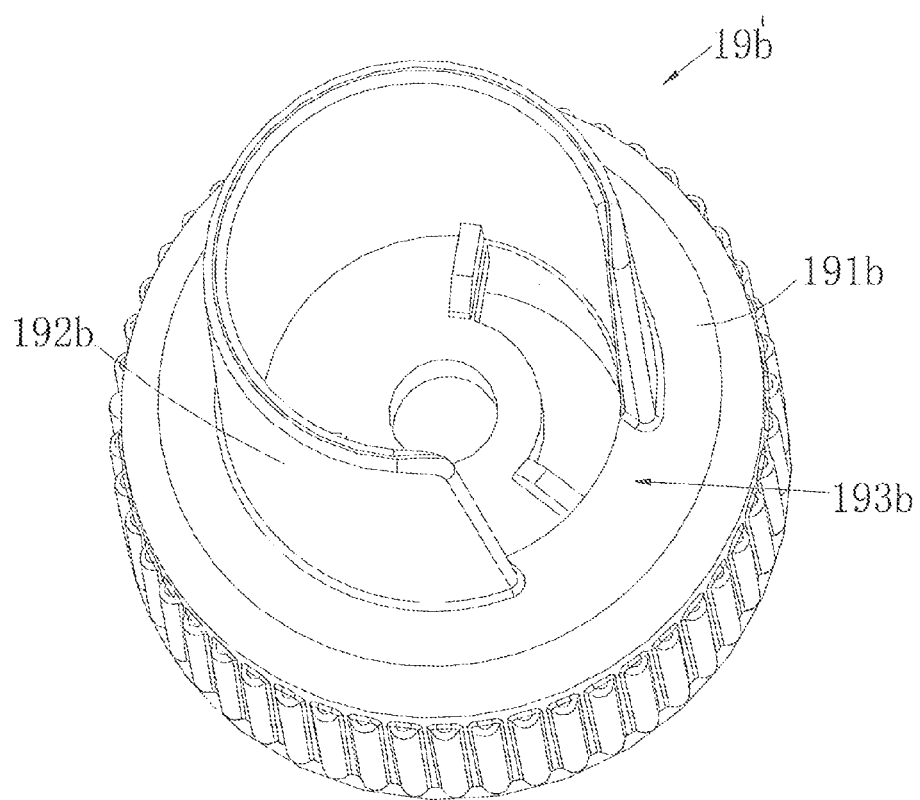
FIG. 5 is a respective view of a rotatable cover of the water tank type electric steamer in accordance with a second embodiment of the present invention.

In a second embodiment, as shown in FIG. 5, the rotatable cover 19b includes a cover body 191b, a hollow extending part 192b extending from the cover body 191b. The extending part 192b integrates as a whole with the cover 191b. The extending part 192b defines a draining opening 192b to prevent the water in the water tank being too full to overflow to the water storage pool 15.

Figure 6:
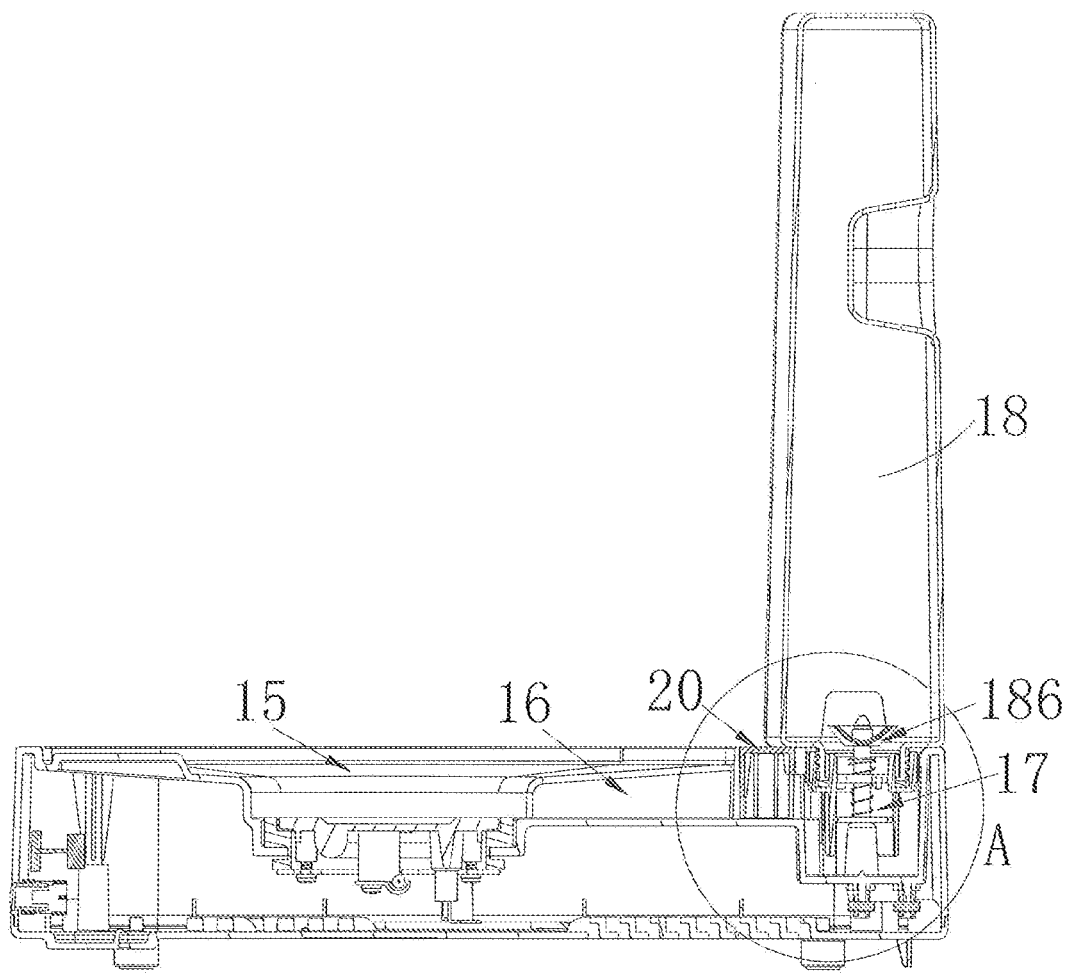
FIG. 6 is a section view of the base and a water tank of the water tank type electric steamer in accordance with an embodiment of the present invention.
Figure 7:
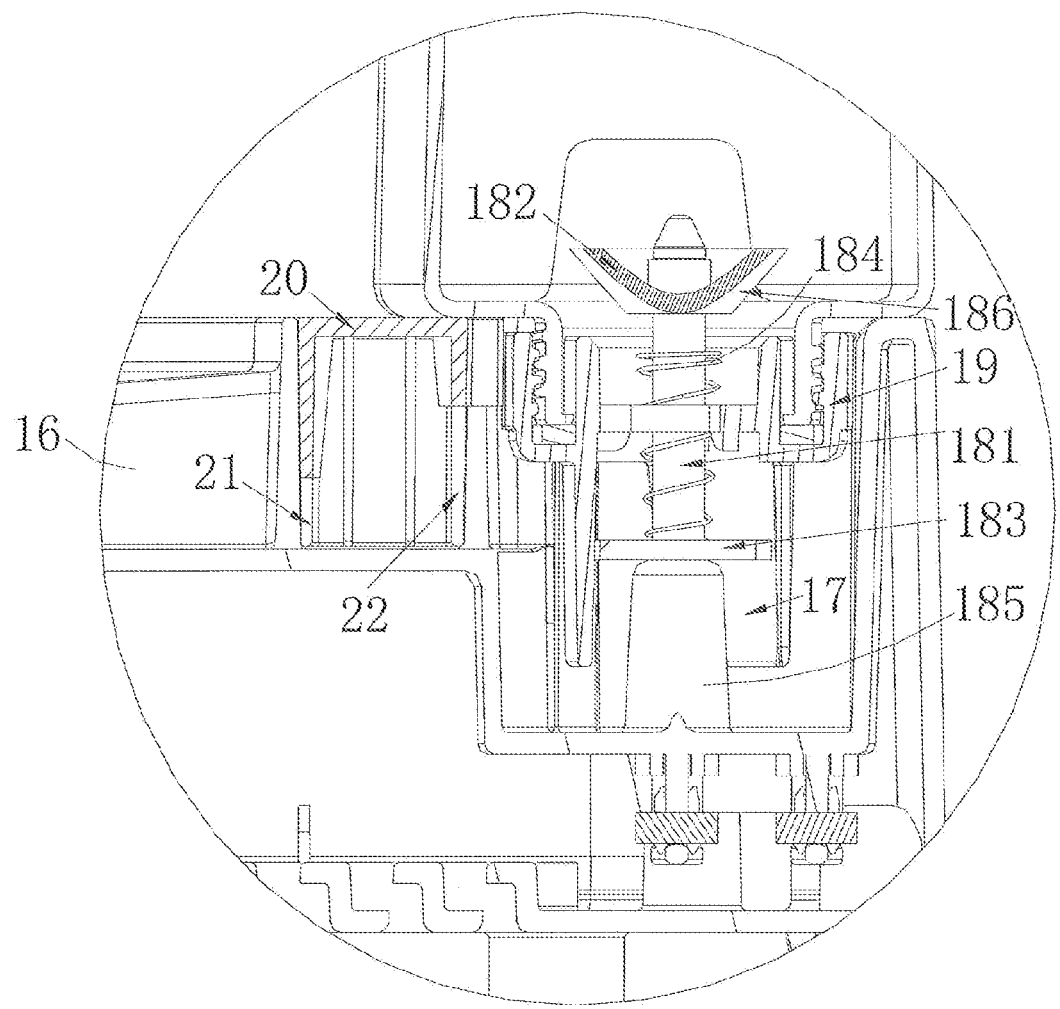
FIG. 7 is an enlarged view of a circle A of the water tank type electric steamer in FIG. 6.
Figure 8:
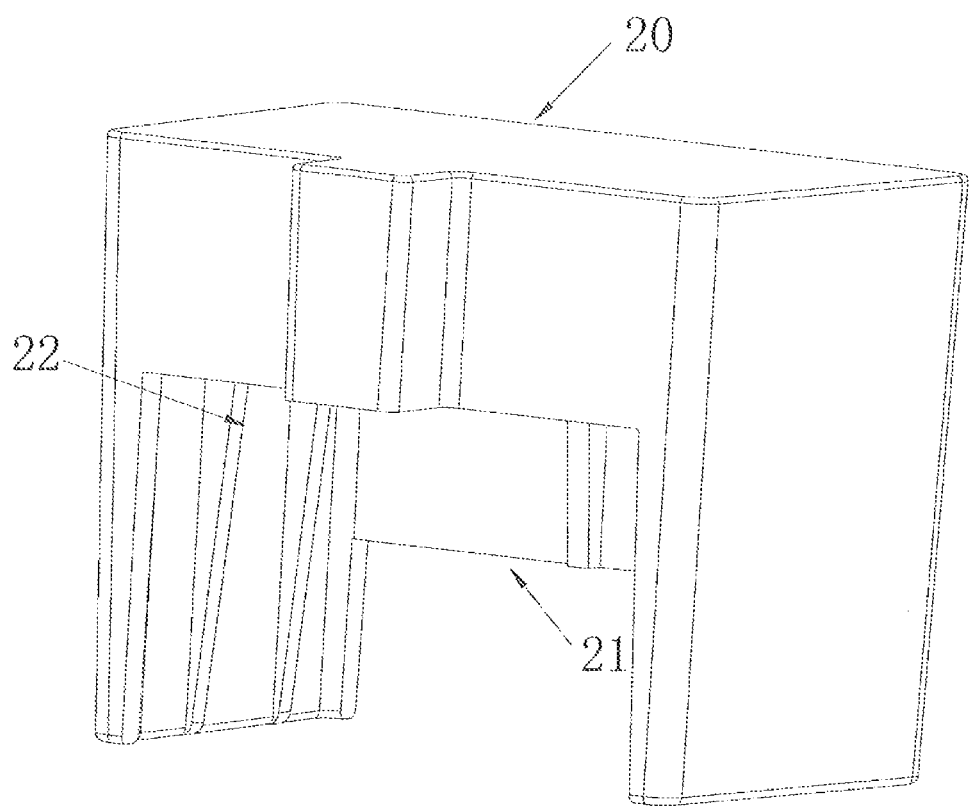
FIG. 8 is a perspective view of a waterproof shield of the water tank type electric steamer in accordance with an embodiment of the present invention.
Figure 9:
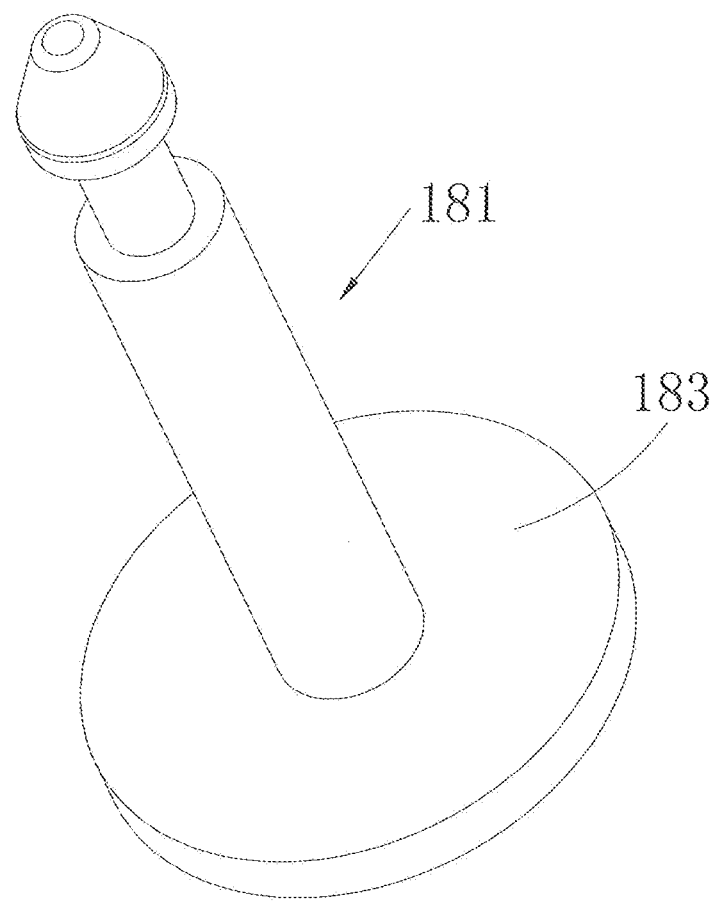
FIG. 9 is a perspective view of a water intake pole of the water tank type electric steamer in accordance with an embodiment of the present invention.

As shown in FIGS. 6 and 7, a waterproof shield 20 is inserted to the through slots 16 in order to prevent the high temperature steam enters into the water tank 18 to heat the water in the water tank, then to rise the temperature of the water tank 18, and further to rise the temperature of the steamer 10. Additionally, the waterproof shield 20 improves the heating effect of the steamer 10 because of the avoidance of the steam loss and heat loss. The bottom of the side of the waterproof shield 20 adjacent to water storage pool opens a first opening 21. The bottom of opposite side of the waterproof shield 20 opens a second opening 22. The first opening 21 communicates with the through slot 16. The second opening 22 communicates with the draining opening 193. Thereby, the water in the water tank 18 flows through the outlet 186, the draining opening 193, the jack 17, the second opening 22, the first opening 21, and the through slot 16, and then goes into the water storage pool 15. The height of the second opening 22 is higher than that of the first opening 21, this structure supplies stable water to the water storage pool 15 due to the potential difference between the first opening 21 and the second opening 22. Further, the height of the first opening 21 limits the height of the flow of the water supply channel. The lower height of the opening prevents the high temperature steam above the flow from entering to the water tank 18 through the waterproof shield 20.

Referring to FIGS. 6 and 7, a water intake pole 181 is inserted to the outlet 186 of the water tank in order to control the water flow of the water tank 18. An end of the water intake pole 181 which locates inside the water tank 18 arranges a sealing block 182 for sealing the outlet 186 of the water tank 18. The other end of the water intake pole 181 which locates outside the water tank 18 connects a support plate 183. A spring 184 is arranged between the support plate 183 and the outlet 186. The spring 184 is in a compressed state and the bottom of the jack 17 arranges a support pole 185 for supporting the support plate 183. Thereby, when the water tank 18 is inserted into the jack 17, the water intake pole 181 moves upwards due to the support providing by the support pole 185 to the support plate 183 while the sealing block 182 do not contact the outlet 186. At this moment, the outlet 186 is in an open state, the water in the water tank 18 flows stably into the jack 17 through the outlet 186. However, when the water tank 18 is pulled out of the jack 17, the support plate 183 loses the support providing by the support pole 185, that leads to the water intake pole 181 moves towards the orientation far away from the outlet 186 under the elastic force of the spring 184, until the sealing block 182 seals the outlet 186.

In order to enable the sealing block 182 to be firmly inserted to the outlet 186 to seal the outlet 186, the outlet 186 of the water tank 18 is shaped as a trapezoid with long upper side and short lower side. The shape of the sealing block 182 matches with the shape of the outlet 186 of the water tank 18. The sealing block 182 is reversed taper shaped and is a rubber block.

Figure 11:
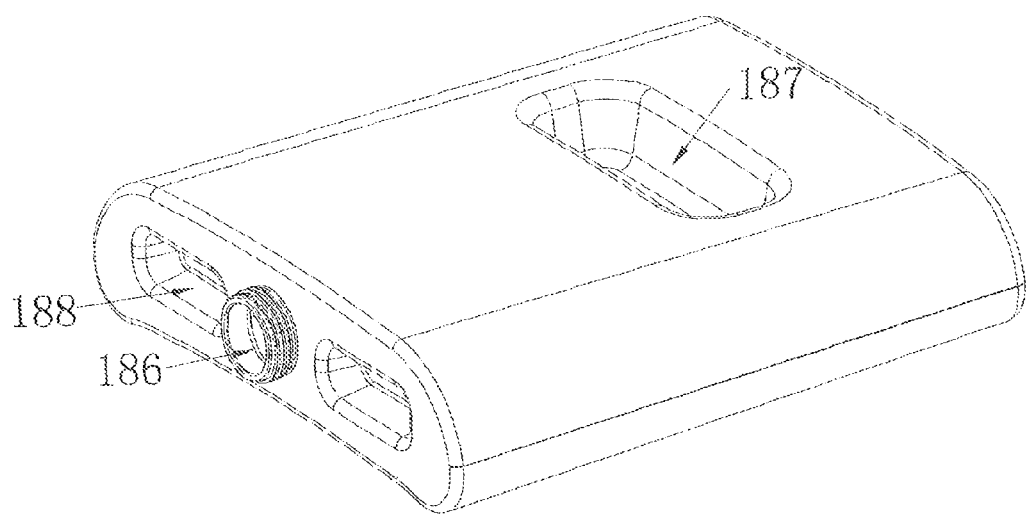
FIG. 11 is a perspective view of the water tank of the water tank type electric steamer in accordance with an embodiment of the present invention.

As shown in FIGS. 2 and 11, in order to enable the water tank 18 to be firmly inserted into the base 11, a protruding block 111 is arranged on the base 11, a positioning groove 188 is grooved on the water tank 18, the protruding block engages with the positioning groove 188. Thereby, it only need to align the rotatable cover 19 of the water tank to the jack 17 and align the positioning groove 188 to the protruding block 111 to insert when fixing the water tank 18 to the base 11, this conveniences the assembling and detachment of the water tank 18.

Figure 10:
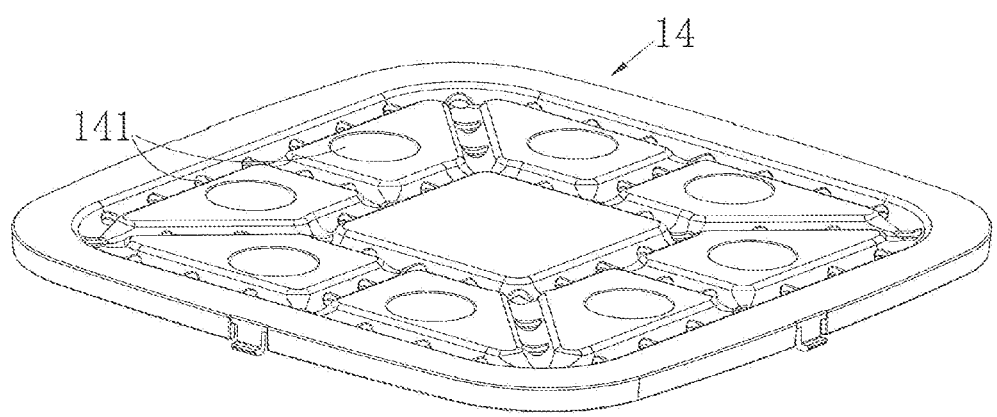
FIG. 10 is a perspective view of a rack bottom of the water tank type electric steamer in accordance with an embodiment of the present invention.

As shown in FIG. 10, in order to enable the high temperature steam go through the rack bottom 14 more uniformly to steam the food, the rack bottom distributes a plurality of holes for the high temperature steam to go through.

As shown in FIG. 11, in order to enable the user to assemble or detach the water tank 18 more conveniently, a handy slot 187 for conveniently taken by hand is arranged on the back of the water tank 18.

Figure 12:
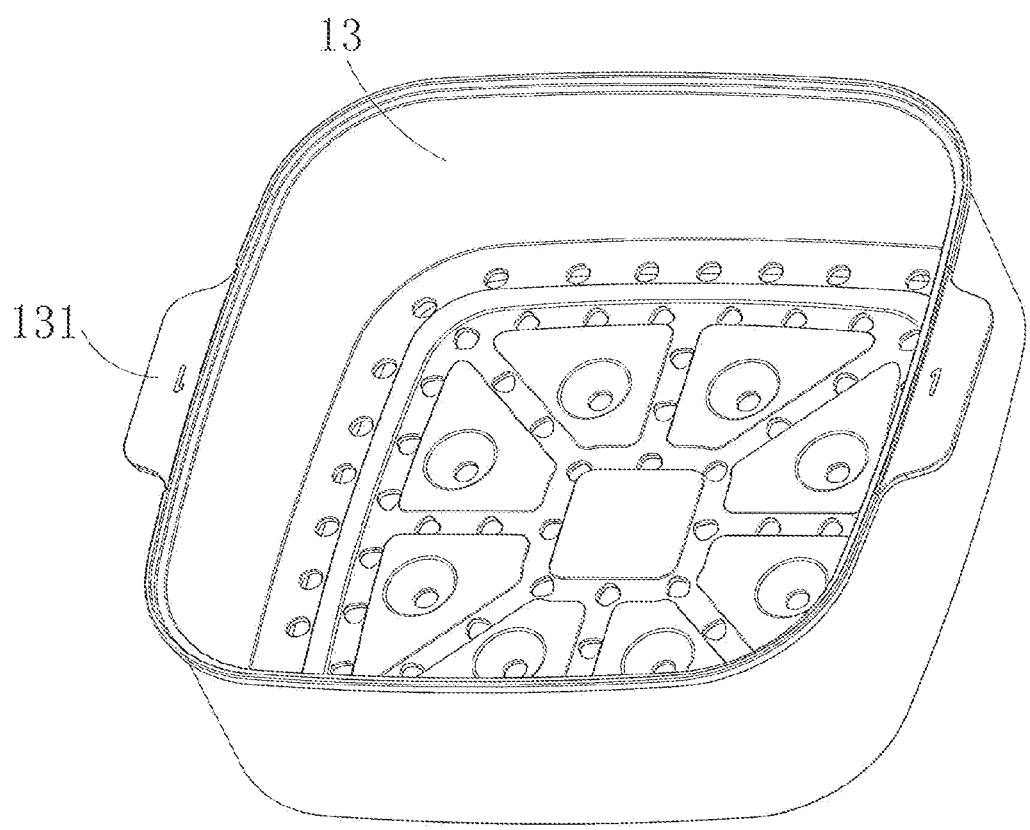
FIG. 12 is a perspective view of a steamer rack together with the rack bottom of the water tank type electric steamer in accordance with an embodiment of the present invention.

As shown in FIG. 12, in order to enable the user to take the steam rack 13 conveniently, handles 131 are arranged on the opposite sides of the steam rack 13.

The above described examples are only a few embodiments of the present invention, and the descriptions are detailed, but it should not be understood that they are intended to limit the invention to these embodiments. It should be noted that, to the person skilled in this art, the alternatives, modifications and equivalent to the embodiments may be included within the spirit and scope of the invention.

What is claimed is:

1. A water tank type steamer, comprising:
a base defining a recess therein, and
a plurality of hollow steam racks are inserted into the recess by stacking one by one from top to down,
wherein a bottom of a side wall of each steam rack is bent inwards to form a stage, an outside wall of the stage is nested in a top of a side wall of the lower steam rack, a rack bottom for holding food is put on an inner side of the stage, a bottom of the recess is formed to have a water storage pool for generating high temperature steam, a through slot for water going through and a jack are defined on the base, the through slot communicates with the water storage pool and the jack, the jack connects with a water tank, an outlet of the water tank orientates downwards to communicate with the jack, and
wherein the outlet of the water tank rotatably connects with a hollow rotatable cover, the rotatable cover includes a cover body, two extending parts extending from the cover body, the two extending parts form a draining opening to prevent the water in the water tank being too full to overflow to the water storage pool, and the rotatable cover is inserted in the jack.

2. The water tank type steamer as claimed in claim 1, wherein a waterproof shield for preventing the high temperature steam in the water storage pool flowing to the water tank is inserted in the through slots, a bottom of a side of the waterproof shield adjacent to water storage pool defines a first opening, and a bottom of an opposite side of the waterproof shield defines a second opening, the first opening communicates with the through slot, and the second opening communicates with the draining opening.

3. The water tank type steamer as claimed in claim 2, wherein a water intake pole is inserted in the outlet of water tank insets, an end of the water intake pole located inside the water tank is formed to have a sealing block for sealing the outlet of the water tank, the other end of the water intake pole located outside the water tank connects with a support plate, and the bottom of the jack is formed to have a support pole for supporting the support plate.

4. The water tank type steamer as claimed in claim 3, wherein the outlet of the water tank is shaped as a trapezoid with long upper side and short lower side, a shape of the sealing block matches with a shape of the outlet of the water tank and is a reversed taper shape.

5. The water tank type steamer as claimed in claim 1, wherein the base is provided with a protruding block, a positioning groove is defined in the water tank, and the protruding block engages in the positioning groove.

6. The water tank type steamer as claimed in claim 1, wherein the rack bottom uniformly distributes a plurality of holes for providing the high temperature steam to go through.

7. The water tank type steamer as claimed in claim 1, wherein a slot for being convenient to be taken by hand is arranged on a back of the water tank.

8. The water tank type steamer as claimed in claim 1, wherein two opposite sides of each of the plurality of the steam racks is provided with handles for being convenient to be lifted.

* * * * *